(12) United States Patent
Kim Yeung

(10) Patent No.: US 8,842,087 B2
(45) Date of Patent: Sep. 23, 2014

(54) METHOD FOR PROCESSING TOUCH SIGNAL AND ELECTRONIC DEVICE USING THE SAME

(75) Inventor: Sip Kim Yeung, New Taipei (TW)

(73) Assignee: Acer Incorporated, New Taipei (TW)

( * ) Notice: Subject to any disclaimer, the term of this patent is extended or adjusted under 35 U.S.C. 154(b) by 225 days.

(21) Appl. No.: 13/477,060

(22) Filed: May 22, 2012

(65) Prior Publication Data

US 2013/0201117 A1    Aug. 8, 2013

(30) Foreign Application Priority Data

Feb. 8, 2012   (TW) .............................. 101104103 A

(51) Int. Cl.
*G06F 3/041*    (2006.01)

(52) U.S. Cl.
USPC ........................................ 345/173; 178/18.01

(58) Field of Classification Search
USPC ..................... 345/156–179; 178/18.01–18.09
See application file for complete search history.

(56) References Cited

U.S. PATENT DOCUMENTS

2012/0038557 A1*   2/2012   DeLuca ........................ 345/169

* cited by examiner

*Primary Examiner* — Premal Patel
(74) *Attorney, Agent, or Firm* — Jianq Chyun IP Office

(57) ABSTRACT

A method for processing touch signal and an electronic device using the method are provided, wherein the method includes following steps: as receiving a touch signal of a touch panel, judging whether a motion vector of the touch panel is abnormal; when the motion vector is abnormal, recording a first time-point; judging whether the motion vector returns to normal state from abnormal state; when the motion vector returns to normal state, recording a second time-point; and performing a signal compensation operation on the touch signal of the duration between the first time-point and the second time-point. In this way, the invention can avoid inputting wrong touch signals.

16 Claims, 4 Drawing Sheets

METHOD FOR PROCESSING TOUCH SIGNAL AND ELECTRONIC DEVICE USING THE SAME

CROSS-REFERENCE TO RELATED APPLICATION

This application claims the priority benefit of Taiwan application Ser. No. 101104103, filed on Feb. 8, 2012. The entirety of the above-mentioned patent application is hereby incorporated by reference herein and made a part of this specification.

BACKGROUND OF THE INVENTION

1. Field of the Invention

The invention generally relates to a touch electronic device, and more particularly, to a method for processing abnormally-inputting touch signal and an electronic device using the method.

2. Description of Related Art

Along with the progress of touch technology, human has growing dependence on electronic devices, and the touch screen is also gradually replacing the traditional screen to become the input and output tools for the electronic devices. Electronic devices on the current market, many of them use touch panel for manipulation. Many consumer electronic products, in order to comply with the demand of users on delicate appearance, also have used the touch panel to save the space of the physical keys.

However, in the use of electronic devices with touch screen, users tend to inadvertently mis-touch the touch panel of electronic device, which leads to inputting wrong touch signal. For example, when the user applies an excessive force onto the touch panel, the touch panel may abnormally move or shake to result in inputting wrong touch signal by the user. As a result, during inputting touch signals, it often fails to get accurate input result and facilitate the operation implementation of the electronic device.

SUMMARY OF THE INVENTION

Accordingly, the invention is directed to a method for processing touch signal and an electronic device using the method. When a touch panel reads an abnormally-inputting touch signal, the invention can compensate/process the touch signal input during abnormally-inputting, which further avoids inputting wrong touch signals and advances the fluency of the input touch signal.

The invention provides a method for processing touch signal, which includes following steps: as receiving a touch signal of a touch panel, judging whether a motion vector of the touch panel is abnormal; when the motion vector is abnormal, recording a first time-point; judging whether the motion vector returns to normal state from abnormal state; when the motion vector returns to normal state, recording a second time-point; and performing a signal compensation operation on the touch signal of the duration between the first time-point and the second time-point.

The invention also provides an electronic device, which includes a touch panel, at least one sensing device and a signal compensation unit. The touch panel reads a touch signal. The sensing device is coupled to the touch panel and senses a motion vector of the touch panel. The signal compensation unit is coupled to the touch panel and the sensing device. When the touch panel reads the touch signal, the signal compensation unit judges whether the motion vector is abnormal and judges whether the motion vector returns to normal state from abnormal state. When the motion vector is abnormal, the signal compensation unit records a first time-point; when the motion vector returns to normal state, the signal compensation unit records a second time-point and performs a signal compensation operation on the touch signal of the duration between the first time-point and the second time-point.

In an embodiment of the present invention, the above-mentioned signal compensation operation includes prompting an abnormal touch information by the touch panel.

In an embodiment of the present invention, the above-mentioned signal compensation operation includes deleting the touch signal read by the touch panel in the duration between the first time-point and the second time-point.

In an embodiment of the present invention, when the touch signal is a linear input signal, the above-mentioned signal compensation operation includes stopping to display the touch signal at the first time-point and recovering to display the touch signal at the second time-point.

In an embodiment of the present invention, the above-mentioned signal compensation operation further includes compensating the touch signal in the duration between the first time-point and the second time-point according to the touch signal prior to the first time-point.

In an embodiment of the present invention, when the touch signal is a push-button input signal, the above-mentioned signal compensation operation includes ignoring the touch signal in the duration between the first time-point and the second time-point and asking to re-input the touch signal.

In an embodiment of the present invention, when the touch signal is a gesture input signal, the above-mentioned signal compensation operation includes ignoring the touch panel prior to the second time-point and re-reading the touch signal by the touch panel.

In an embodiment of the present invention, the above-mentioned sensing device includes a G-sensor (gravity sensor), a gyro sensor or a compass sensor.

In an embodiment of the present invention, when the touch panel is in static state, the signal compensation unit judges the motion vector returns to normal state from abnormal state.

Based on the description above, when the touch panel reads the touch signal, the electronic device can judge whether the motion vector of the touch panel is abnormal and judge whether the motion vector returns to normal state and the electronic device can compensate the touch signal received in the duration for the motion vector of the touch panel is abnormal. In this way, when the touch panel has abnormal moving or shaking to cause the user to mis-touch the touch panel and input a wrong touch signal, the electronic device can compensate/process the wrong touch signal and further avoid abnormally-inputting touch signal and advance the fluency of the input touch signal.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
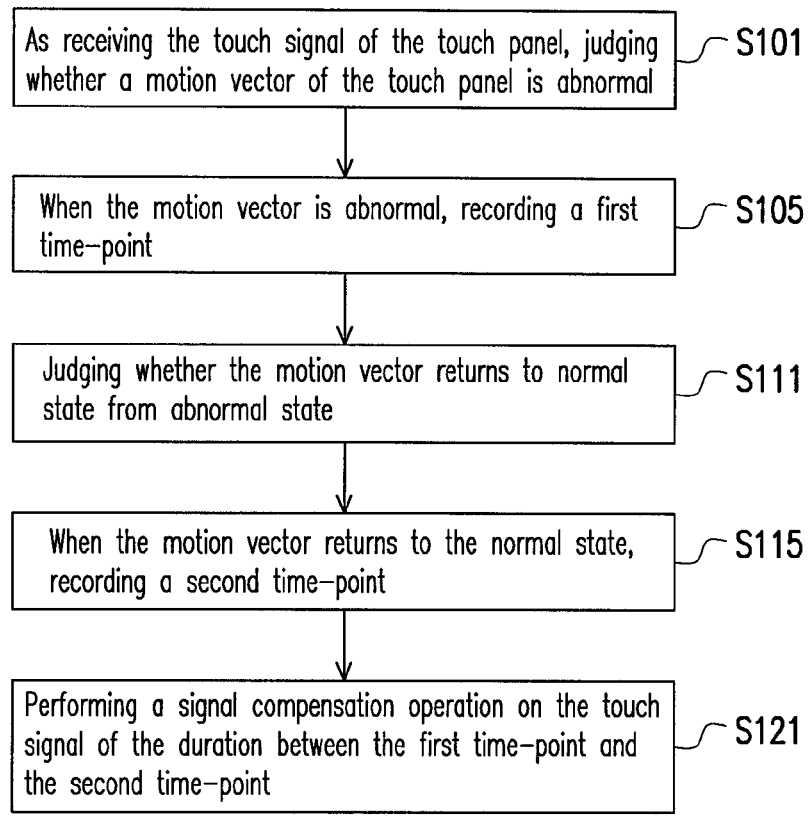
FIG. 1 is a brief flowchart of a method for processing touch signal according to an embodiment of the invention.
Figure 2:
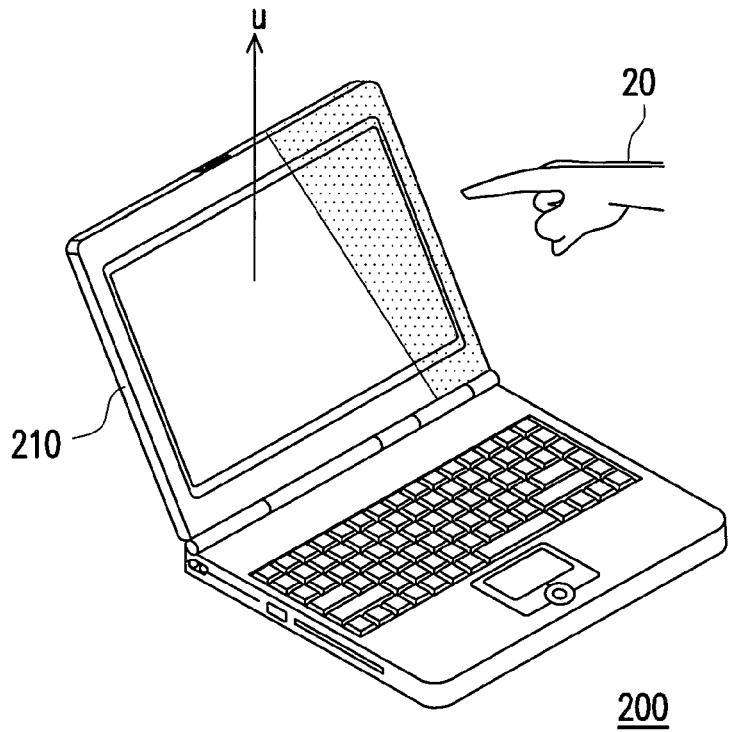
FIG. 2 is a schematic diagram showing an electronic device receives the touch signal read by the touch panel according to a method for processing touch signal in an embodiment of the invention.

FIG. 1 is a brief flowchart of a method for processing touch signal according to an embodiment of the invention. The method for processing touch signal of the embodiment is suitable to an electronic device, in which the electronic device includes a touch panel. As an example, FIG. 2 is a schematic diagram showing a touch panel 210 of an electronic device 200 receives the touch signal according to an embodiment of the invention. Referring to FIGS. 1 and 2, the electronic device 200 is, for example, notebook computer, tablet computer, personal digital assistant (PDA), mobile phone, digital camera, e-book, game machine or other electronic devices with touch panel. The touch panel 210 can read and/or display the touch signal input by a user. In addition, the electronic device 200 has at least one sensing device for detecting the moving of the electronic device 200. After, for example, all the detection results of every sensing device are summed up, the motion vector of the electronic device 200 at every time-point can be calculated. The sensing device includes a G-sensor (gravity sensor), a gyro sensor, a compass sensor or other sensors able to detect the moving of the electronic device 200.

In step S101, as the electronic device 200 receives the touch signal read by the touch panel 210, the electronic device 200 judges whether a motion vector of the touch panel 210 is abnormal. As the touch panel 210 in the electronic device 200 reads the touch signal input by the user (for example, a hand 20 touches, i.e., presses or pushes, the touch panel 210 to input signal as shown by FIG. 2), the sensing device (not shown) in the electronic device 200 would calculate the motion vector u of the electronic device 200 to further judge whether the motion vector u of the touch panel 210 is abnormal by the electronic device 200. For example, if the user applies an excessive force onto the touch panel 210 and makes the touch panel 210 abnormally move or shake, the situation of the touch panel 210 with abnormal moving may lead in the user mis-touches an unexpected position on the touch panel 210. By judging whether the motion vector u of the touch panel 210 is abnormal, the electronic device 200 can decide whether to perform a signal compensation operation on the touch signal. In other words, the electronic device 200 can judge whether the touch signal of the touch panel 210 is abnormal according to the motion vector u.

Taking an example, if the motion vector u is greater than a predetermined first threshold, the electronic device 200 can judge out the touch panel 210 abnormally moves or shakes. If the motion vector u is less than a predetermined second threshold, the electronic device 200 can judge out the touch panel 210 is in static state. In the description above, the second threshold is less than the first threshold.

In step S105, when the motion vector u in FIG. 2 is abnormal, the electronic device 200 records a first time-point. In step S111, the electronic device 200 judges whether the motion vector u returns to normal state from abnormal state. When the motion vector u returns to the normal state, the electronic device 200 conducts step S115 to record a second time-point. In other words, the electronic device 200 can detect the duration for the motion vector u of the touch panel 210 is abnormal and the duration is just the time length between the first time-point and the second time-point.

In step S121, the electronic device 200 performs a signal compensation operation on the touch signal of the duration between the first time-point and the second time-point. In the embodiment, the signal compensation operation performed by the electronic device 200 can be different according to different input types of the touch signal, in which the touch signal includes linear input signal, push-button input signal and gesture input signal, and the push-button input signal can be also a selecting signal. In following, the signal compensation operations performed by the electronic device 200 corresponding to different types of touch signal are depicted.

Figure 3A:
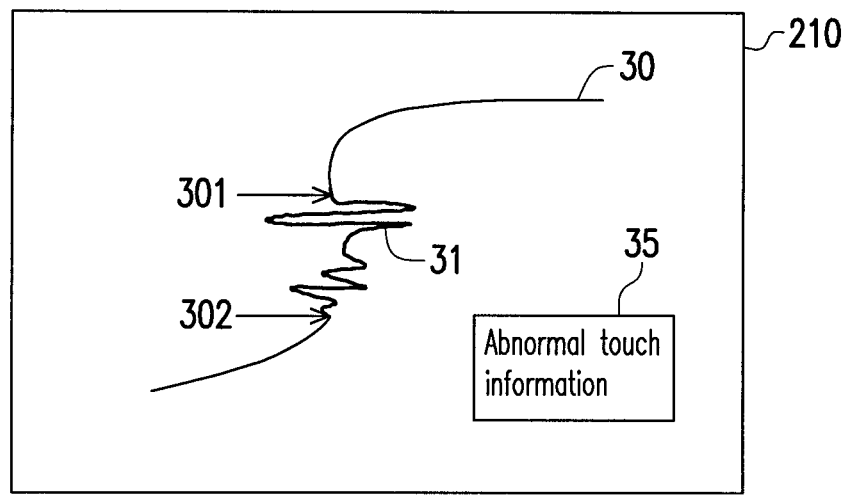
FIG. 3A is a schematic diagram showing a signal compensation operation when the touch signal is a linear input signal in a method for processing touch signal according to an embodiment of the invention.

FIG. 3A is a schematic diagram showing a signal compensation operation when the touch signal is a linear input signal according to an embodiment of the invention. Referring to FIG. 3A, assuming herein the hand 20 of the user moves around on the touch panel 210 so as to draw a straight line, a curve or other linear input signal traces on the touch panel 210. When the touch panel 210 is in static state, the electronic device 200 can read a normal touch signal through the touch panel 210, i.e., a linear input signal 30 shown by FIG. 3A. When the electronic device 200 judges the motion vector of the touch panel 210 is abnormal, the electronic device 200 records the first time-point, for example, the time-point shown by an arrow 301 is recorded. When the touch panel 210 returns to the static state from the abnormal moving state (i.e., when the motion vector u of the touch panel 210 returns to the normal state from the abnormal state), the electronic device 200 records the second time-point, for example, the time-point shown by an arrow 302 is recorded. In other words, by judging whether the motion vector of the touch panel 210 is abnormal, the electronic device 200 can detects out an abnormal linear input signal 31 occurring in the duration between the first time-point and the second time-point. Thereafter, the electronic device 200 performs a signal compensation operation on the abnormal linear input signal 31 occurring in the duration between the first time-point and the second time-point.

In more details, the electronic device 200 can provide/display an abnormal touch information 35 on the touch panel 210 to remind the user that the signal input by the user in the duration between the first time-point and the second time-point is the abnormal linear input signal 31 and the signal compensation operation is performed. The content of the above-mentioned abnormal touch information 35 is, for example, 'abnormal shaking occurs' or other prompt information.

Figure 3B:
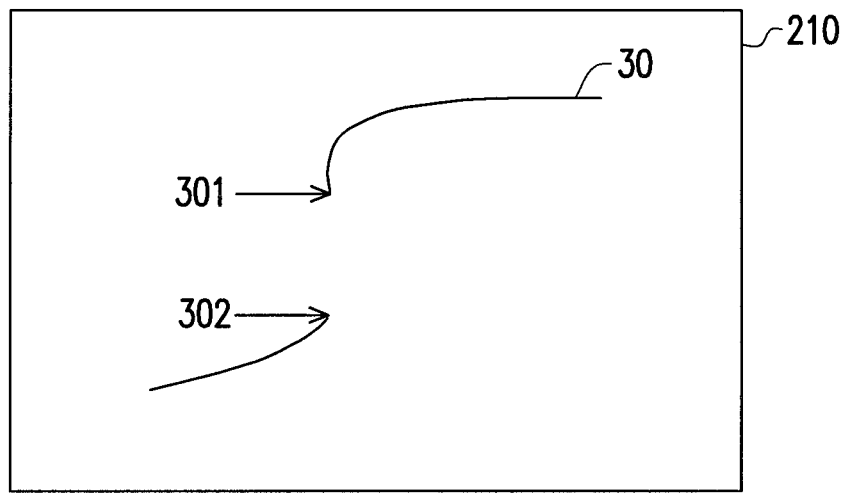
FIG. 3B is a schematic diagram showing a signal compensation operation when the touch signal is a linear input signal in a method for processing touch signal according to another embodiment of the invention.

The embodiment does not limit the signal compensation operation on the abnormal linear input signal 31 occurring in the duration between the first time-point and the second time-point, and the signal compensation operation depends on the real product design. For example, FIG. 3B is a schematic diagram showing a signal compensation operation when the touch signal is a linear input signal according to another embodiment of the invention. As shown by FIG. 3B, the above-mentioned signal compensation operation can stop displaying the linear input signal 30 at the first time-point shown by an arrow 301 and recover displaying the linear input signal 30 at the second time-point shown by an arrow 302. In another embodiment, the signal compensation operation includes deleting the touch signal read in the duration between the first time-point and the second time-point. In other embodiments, the signal compensation operation can also allow the user optionally delete or keep the abnormal linear input signal 31 occurring in the duration between the first time-point and the second time-point.

Figure 3C:
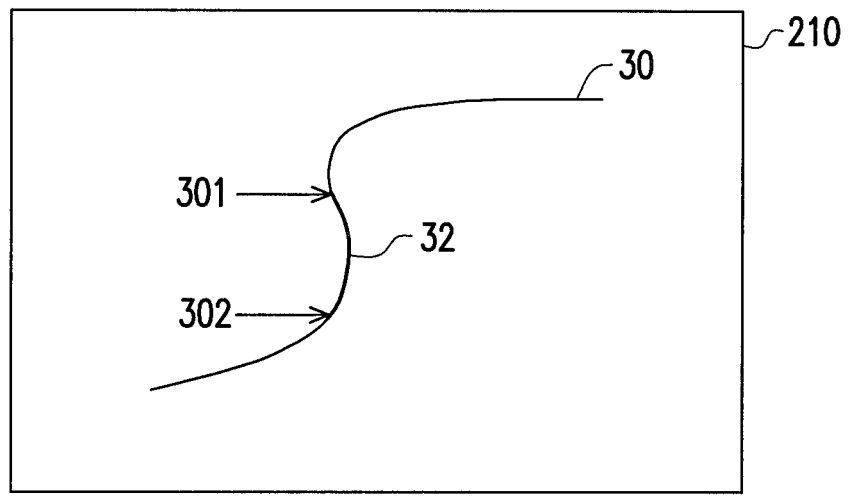
FIG. 3C is a schematic diagram showing a signal compensation operation when the touch signal is a linear input signal in a method for processing touch signal according to yet another embodiment of the invention.

In yet another embodiment, the electronic device 200 can calculate/compensate the touch signal in the duration between the first time-point and the second time-point. For example, FIG. 3C is a schematic diagram showing a signal compensation operation when the touch signal is a linear input signal according to yet another embodiment of the invention. Referring to FIG. 3C, the signal compensation operation can compensate the touch signal in the duration between the first time-point and the second time-point according to the touch signal prior to the first time-point (i.e., the linear input signal 30) and/or the touch signal after the second time-point. At the time, the electronic device 200 can, through calculation, simulate the touch signal (i.e., the linear input signal 32) in the duration between the first time-point and the second time-point (as shown by the arrow 302) of the linear input signal 30 according to the linear input signal 30 prior to the first time-point (as shown by the arrow 301). The above-mentioned calculation of the linear input signal 32 can be extrapolation algorithm, interpolation algorithm, inertia algorithm or prediction algorithm. In another embodiment, the signal compensation operation allows the user to re-input the touch signal in the duration between the first time-point and the second time-point to replace the abnormal linear input signal 31. In this way, the electronic device 200 can compensate the touch signal received in the duration where the motion vector of the touch panel 210 is abnormal so as to avoid wrong input result.

Figure 4:
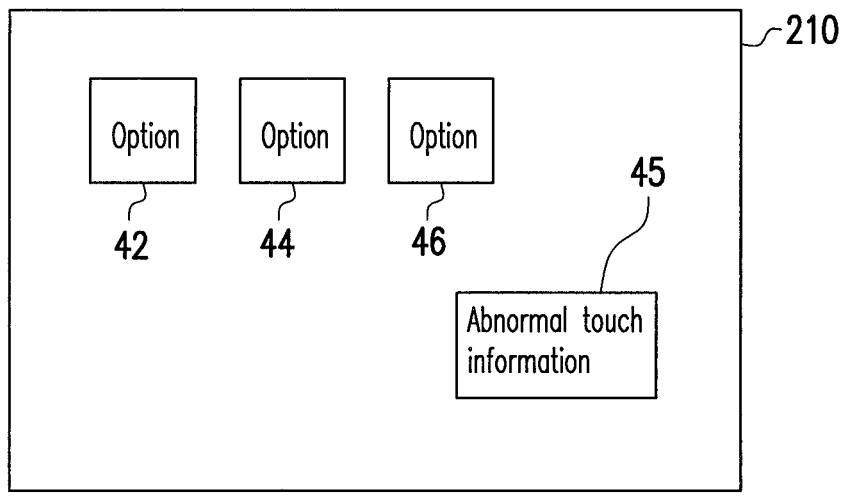
FIG. 4 is a schematic diagram showing a signal compensation operation when the touch signal is a push-button input signal in a method for processing touch signal according to an embodiment of the invention.

FIG. 4 is a schematic diagram showing a signal compensation operation when the touch signal is a push-button input signal according to an embodiment of the invention. Referring to FIG. 4, the user can input a push-button input signal by touching and selecting an option tab (or a virtual push-button, for example, option 42, 44 or 46) displayed by the touch panel 210. Assuming at the time, the hand 20 of the user wishes to press the option 42 of the touch panel 210, in normal situation, the touch signal of the touch panel 210 read by the electronic device 200 should be within the range occupied by the option tab 42 and, no doubt, the electronic device 200 can perform a function corresponding to the option 42. However, if the touch panel 210 has abnormal moving or shaking, the touch signal of the touch panel 210 at the time may be produced by a place out of the range occupied by the option 42 although the hand 20 of the user wishes to press the option 42 of the touch panel 210. Even worse, the hand mis-triggers an unexpected option (for example, the option 44 or 46). At the time, the electronic device 200 fails to confirm whether to perform the function corresponding to the option 42 and even a wrong action (for example, triggering an unexpected option) may occur.

In order to avoid the above-mentioned situation, when the electronic device 200 judges out the motion vector of the touch panel 210 is abnormal, the electronic device 200 records a first time-point; when the electronic device 200 judges out the motion vector of the touch panel 210 returns to the normal state from the abnormal state, the electronic device 200 records a second time-point. When the touch signal of the touch panel 210 is a push-button input signal, the signal compensation operation performed by the electronic device 200 includes ignoring the touch signal in the duration between the first time-point and the second time-point and asking the user to re-input the touch signal (for example, re-selecting the option 42, 44 or 46). In more details, the signal compensation operation can ignore the push-button input signal in the duration between the first time-point and the second time-point and provide an abnormal touch information 45 to ask re-inputting the push-button input signal. In this way, the user can decide whether re-inputting the touch signal to avoid a wrong input result by using the prompt of the abnormal touch information 45.

Figure 5:
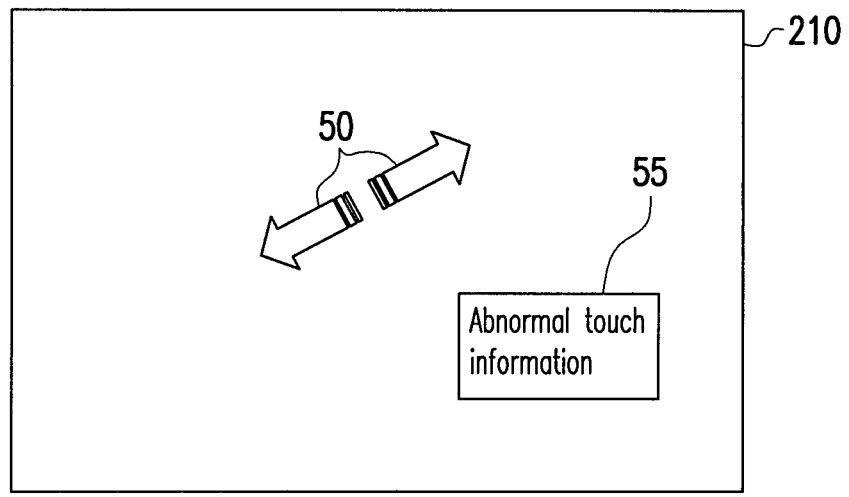
FIG. 5 is a schematic diagram showing a signal compensation operation when the touch signal is a gesture input signal in a method for processing touch signal according to an embodiment of the invention.

FIG. 5 is a schematic diagram showing a signal compensation operation when the touch signal is a gesture input signal according to an embodiment of the invention. Referring to FIG. 5, the touch panel 210 can read a gesture input signal 50 input by the user. For example, the hand 20 of the user can, for example, conduct a gesture action such as sliding, dragging, pressing or pinching on the touch panel 210. As the touch panel 210 reads the gesture input signal 50, if the electronic device 200 judges out the motion vector of the touch panel 210 is abnormal, the electronic device 200 records a first time-point; when the electronic device 200 judges out the motion vector of the touch panel 210 returns to the normal state from the abnormal state, the electronic device 200 records a second time-point. That is to say, when the gesture input signal 50 in the duration between the first time-point and the second time-point is abnormal, the electronic device 200 would perform a signal compensation operation on the signal of the duration between the first time-point and the second time-point. In more details, the signal compensation operation can ignore the gesture input signal prior to the second time-point and provide an abnormal touch information 55 to remind the user re-conducting a gesture action, so that the touch panel 210 re-reads the gesture input signal to avoid a wrong input result.

Figure 6:
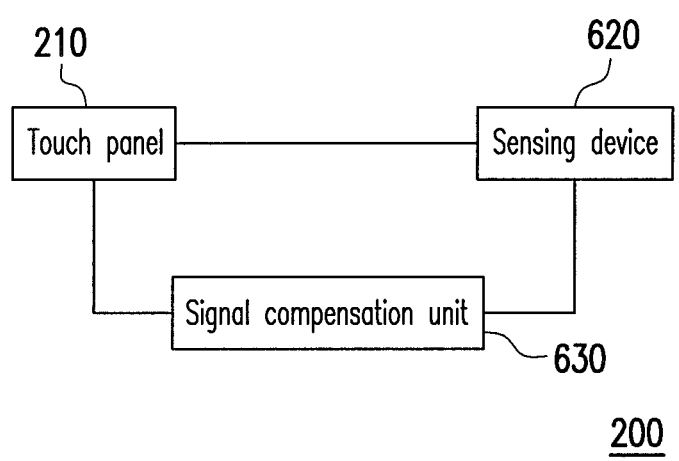
FIG. 6 is a schematic diagram of an electronic device according to an embodiment of the invention.

FIG. 6 is a schematic diagram of an electronic device according to an embodiment of the invention. The electronic device 200 of the embodiment can refer to the description of FIGS. 1-5. Referring to FIG. 6, the electronic device 200 of the embodiment includes a touch panel 210, at least one sensing device 620 and a signal compensation unit 630. The touch panel 210 is for reading a touch signal, and the touch signal is, for example, a linear input signal, a push-button input signal or a gesture input signal input by the user on the touch panel 210. The sensing device 620 is coupled to the touch panel 210 to sense the motion vector of the touch panel 210. The sensing device 620 is, for example, at least one of G-sensor (gravity sensor), gyro sensor, compass sensor or other sensors.

The signal compensation unit 630 is coupled to the touch panel 210 and the sensing device 620. As the touch panel 210 reads the touch signal, the signal compensation unit 630 judges whether the motion vector of the touch panel 210 is abnormal according to the sensing result of the sensing device 620 and judges whether the motion vector of the touch panel 210 returns to the normal state from the abnormal state. In the embodiment, when the motion vector is abnormal, the signal compensation unit 630 records a first time-point. When the signal compensation unit 630 judges out the motion vector returns to the normal state, the signal compensation unit 630 records a second time-point and signal compensation unit 630 performs a signal compensation operation on the touch signal of the duration between the first time-point and the second time-point. The method for processing touch signal of the embodiment is the same as the above-mentioned embodiments (referring to the related depictions of FIGS. 1-5), which is omitted to describe.

In summary, in the method for processing touch signal and the electronic device of the invention, as the electronic device receives a touch signal of the touch panel, the electronic device would judge whether the motion vector of the touch panel is abnormal and judge whether the motion vector returns to normal state, and the electronic device can respectively record the time-points corresponding to inputting the touch signal. The electronic device can compensate the touch signal received in the duration where the motion vector is abnormal. In this way, the electronic device can judge out wrong touch signals, so that the user can avoid abnormally-inputting touch signal and further advance the fluency of the input touch signal.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A method for processing touch signal, comprising:
   judging whether a motion vector of a touch panel is abnormal as receiving a touch signal of the touch panel;
   recording a first time-point when the motion vector is abnormal;
   judging whether the motion vector returns to normal state from abnormal state;
   recording a second time-point when the motion vector returns to normal state; and
   performing a signal compensation operation on the touch signal of duration between the first time-point and the second time-point, wherein the signal compensation operation further comprises compensating the touch signal in the duration between the first time-point and the second time-point according to the touch signal prior to the first time-point.

2. The method for processing touch signal as claimed in claim 1, wherein the signal compensation operation comprises prompting an abnormal touch information.

3. The method for processing touch signal as claimed in claim 1, wherein the signal compensation operation comprises deleting the touch signal read in the duration between the first time-point and the second time-point.

4. The method for processing touch signal as claimed in claim 1, wherein the signal compensation operation comprises stopping to display the touch signal at the first time-point and recovering to display the touch signal at the second time-point when the touch signal is a linear input signal.

5. The method for processing touch signal as claimed in claim 1, wherein the signal compensation operation comprises ignoring the touch signal in the duration between the first time-point and the second time-point and asking to re-input the touch signal when the touch signal is a push-button input signal.

6. The method for processing touch signal as claimed in claim 1, wherein the signal compensation operation comprises ignoring the touch panel prior to the second time-point and re-reading the touch signal when the touch signal is a gesture input signal.

7. The method for processing touch signal as claimed in claim 1, wherein the motion vector is generated by at least one sensing device, wherein the sensing device comprises a G-sensor (gravity sensor), a gyro sensor or a compass sensor.

8. The method for processing touch signal as claimed in claim 1, wherein the method comprises judging the motion vector returns to normal state from abnormal state when the touch panel is in static state.

9. An electronic device, comprising:
   a touch panel, configured for reading a touch signal;
   at least one sensing device, coupled to the touch panel and sensing a motion vector of the touch panel; and
   a signal compensation unit, coupled to the touch panel and the sensing device, wherein the signal compensation unit judges whether the motion vector is abnormal when the touch panel reads the touch signal, and judges whether the motion vector returns to normal state from abnormal state,
   wherein the signal compensation unit records a first time-point when the motion vector is abnormal; the signal compensation unit records a second time-point and performs a signal compensation operation on the touch signal of duration between the first time-point and the second time-point when the motion vector returns to normal state, wherein the signal compensation operation further comprises compensating the touch signal of the duration between the first time-point and the second time-point according to the touch signal prior to the first time-point.

10. The electronic device as claimed in claim 9, wherein the signal compensation operation comprises prompting an abnormal touch information by the touch panel.

11. The electronic device as claimed in claim 9, wherein the signal compensation operation comprises deleting the touch signal read by the touch panel in the duration between the first time-point and the second time-point.

12. The electronic device as claimed in claim 9, wherein the signal compensation operation comprises stopping to display the touch signal by the touch panel at the first time-point and recovering to display the touch signal by the touch panel at the second time-point when the touch signal is a linear input signal.

13. The electronic device as claimed in claim 9, wherein the signal compensation operation comprises ignoring the touch signal in the duration between the first time-point and the second time-point and asking to re-input the touch signal when the touch signal is a push-button input signal.

14. The electronic device as claimed in claim 9, wherein the signal compensation operation comprises ignoring the touch panel prior to the second time-point and re-reading the touch signal by the touch panel when the touch signal is a gesture input signal.

15. The electronic device as claimed in claim 9, wherein the sensing device comprises a G-sensor (gravity sensor), a gyro sensor or a compass sensor.

16. The electronic device as claimed in claim 9, wherein the signal compensation unit judges the motion vector returns to normal state from abnormal state when the touch panel is in static state.

* * * * *